UNITED STATES PATENT OFFICE 2,474,613

COPOLYMERS OF VINYL ISOCOUMARANS WITH STYRENES AND PROCESS FOR OBTAINING SAME

Arthur L. Barney, Wilmington, Del., assignor to E. I. du Pont de Nemours & Company, Wilmington, Del., a corporation of Delaware No Drawing. Application September 19, 1946, Serial No. 697,901

7 Claims. (Cl. 260—74)

This invention relates to new and useful compositions of matter, and more particularly to polymeric materials.

This invention has as an object a class of polymeric materials comprising new copolymers which are characterized by high melting points, and which are of particular value in the coating, molding and textile arts. Further objects reside in methods for obtaining these copolymers. Other objects will appear hereinafter.

The above objects are accomplished by copolymerizing at moderate temperature and in contact with a polymerization catalyst a mixture of certain vinyl isocoumarans which are defined below, and particularly 1,3-alkyl-4-vinylisocoumarans, with styrene or a halogen substituted styrene.

The above mentioned vinyl isocoumarans have the formula

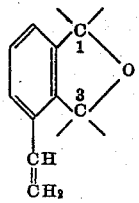

wherein the two valences of each of carbon atoms at positions 1 and 3 are satisfied by substituents selected from the group consisting of hydrogen and hydrocarbon radicals consisting of monovalent alkyl radicals, monovalent aryl radicals, and divalent polymethylene radicals having a chain of four to five carbon atoms, not more than one of said substituents being hydrogen, the valences of carbon atoms at positions 1 and 3, when satisfied by a polymethylene radical, being attached to the terminal carbon atoms of a divalent polymethylene radical having a chain of four to five carbon atoms to form a polymethylene ring of five to six carbon atoms.

The present copolymers are obtained by reacting a mixture of polymerizable materials consisting wholly or preponderately of those defined above at normal or elevated temperatures in contact with a polymerization catalyst. The reaction is best carried out by contacting a mixture of the vinyl isocoumaran and styrene, or a halogen-substituted styrene, with from 0.25 to 1.0% of a peroxygen compound such as ammonium persulfate, based on the total weight of the monomers employed, and a suitable medium such as water, or in conjunction with water insoluble catalysts such as benzoyl peroxide, an organic solvent such as benzene. When employing an aqueous system, it is advantageous to use any of a number of commonly used emulsifying agents, such as the sodium salts of higher alkyl sulfates, to aid in the proper dispersion of the monomers. In addition, it is preferred to employ 0.01 to 0.5% of an auxiliary catalyst, such as sodium bisulfite, in conjunction with water soluble catalysts such as ammonium persulfate. The reaction medium, whether aqueous or non-aqueous, is not an essential constituent of the reaction mixture, but we prefer to employ one to aid in the proper mixing and dispersing of the catalyst and monomers with one another. The reaction can be carried out, however, without the inclusion of water and a dispersing agent, or an organic solvent, in the reaction mixture. The reaction may be run in a closed system or additional monomer or monomers may be injected from time to time as desired. The following examples, in which the parts given are by weight, illustrate ways in which the invention may be practiced.

EXAMPLE 1

There is added to a suitable vessel, 50 parts of styrene, 50 parts of 1,1,3,3-tetramethyl-4-vinylisocoumaran, 5 parts of oleic acid, 2.5 parts of sodium hydroxide, 0.5 part of potassium persulfate, 1 part of sodium dinaphthyl methane sulfonate and 300 parts of copper-free distilled water, and the reaction mixture agitated for 16 hours at 50° C. The product after cooling and opening the reaction vessel is coagulated with a 10% solution of aluminum sulfate, isolated by filtration, washed with water and finally with methanol. After drying 16 hours at 80° C., there is obtained 90 parts of white polymer which, after subjecting to 1000 p. s. i. pressure and 180° C. for 2 minutes, possesses a softening point of 139° C., a Rockwell hardness value of 129, a tensile strength of 1300 p. s. i. and an Izod impact strength of 0.178 lb./in. notch.

EXAMPLE 2

There is added to a suitable vessel, 70 parts of styrene, 30 parts of 1,1,3,3-tetramethyl-4-vinylisocoumaran, 12.4 parts of a dispersing agent containing as the active ingredient 32% of the sodium salts of higher alkyl sulfonates, 1 part of ammonium persulfate, 0.1 part of sodium bisulfite and 300 parts of copper-free distilled water, and the reaction mixture agitated for 16 hours at 60° C. The product, after cooling and opening the reaction vessel, is coagulated with a 10% solution of aluminum sulfate, isolated by filtration, washed repeatedly with water and finally with methanol. After drying for 4 hours at 70° C., there is obtained 90 parts of white polymer possessing a relative viscosity of 1.120, (determined on a solution of 0.1 g. of polymer in 100 ml. of benzene). The polymer thus prepared, and after subjecting to 1000 p. s. i. pressure and 175° C., for 2 minutes, possesses a softening point of 131° C., a Rockwell hardness value of 122, a tensile strength of 4220 p. s. i., a flexural strength of 7160 p. s. i. and an Izod impact strength of 0.279 lb./in. notch.

EXAMPLE 3

There is added to a suitable reaction vessel, 90 parts of styrene, 10 parts of 1,1,3,3-tetramethyl-4-vinylisocoumaran, 12.4 parts of a dispersing agent mentioned in Example 2, 1 part of ammonium persulfate, 0.1 part of sodium bisulfite and 300 parts of copper-free distilled water, and the reaction mixture agitated for 16 hours at 60° C. The product after cooling and opening the reaction vessel, is coagulated with a 10% solution of aluminum sulfate, isolated by filtration, washed repeatedly with water and finally with methanol. After drying the product for 4 hours at 90° C., there is obtained 87 parts of a white polymer posessing a relative viscosity of 1.148 (as determined on a solution of 0.1 g. of polymer in 100 ml. of benzene). The polymer thus prepared, and after subjecting to 1000 p. s. i. pressure and 155° C. for 1 minute, possesses a softening point of 105° C., a Rockwell hardness value of 120, a tensile strength of 5590 p. s. i., a flexural strength of 10,730 p. s. i. and an Izod impact strength of 0.221 lb./in. notch.

Examples of hydrocarbon substituents in the previously defined vinyl isocoumarans include methyl, ethyl, propyl, isobutyl, tertiary butyl, isoamyl, hexyl, dodecyl, tetramethylene, pentamethylene, phenyl, tolyl, and xylyl. Further examples of vinyl isocoumarans useful in the practice of this invention are 1,3-dimethyl-4-vinylisocoumaran, 1,3-dimethyl-1,3-diethyl-4-vinyl - isocoumaran, 1,3-dimethyl-1,3-dipropyl-4-vinylisocoumaran, 1,3-dipentamethylene-4-vinylisocoumaran [4'-vinyldispiro-(cyclohexane - 1,1' - isocoumaran-3'-1''-cyclohexane)], 1,3-dimethyl-1,3-diphenyl-4-vinylisocoumaran, 1,3-dimethyl-1,3-di(p-tolyl)-4-vinylisocoumaran and the like.

The vinyle isocoumarans most advantageously used in the practice of this invention are those in which the hydrocarbon radicals in the 1,3-positions contain from 1 to 6 carbon atoms, preferably alkyl.

Examples of halogen substituted styrenes useful in the practice of this invention include dichlorostyrene, difluorostyrene, p-chlorostyrene, p - fluorostyrene, alpha - chlorostyrene, alpha-fluorostyrene, p-bromostyrene and p-iodostyrene.

The temperatures employed in carrying out the process of this invention lie in the range from about 25° C. to about 200° C., the actual temperature being employed depending on the polymerizing characteristics of the particular unsaturated compound which is to be polymerized. In general, however, the preferred range of temperature is 40 to 100° C., since within this range, the above compounds polymerize at a satisfactory rate and in such a fashion that the reaction is readily controllable.

The process of this invention can be carried out under pressures varying from atmospheric to 1000 atmospheres or higher, the upper pressure limit depending only on the apparatus available. In general, however, it is preferred, for reasons of convenience, to carry out the polymerizations at ordinary or autogenous pressures.

The use of water, or an organic solvent, is not an essential feature of the invention; however, in most cases, the use of water, or an organic solvent, is desirable to aid in the proper mixing and dispersing of catalyst and monomers. Examples of organic solvents which may be employed, instead of or in addition to water, include hydrocarbons such as hexane, octane, isooctane, cyclohexane, methyl cyclohexanes, benzene, toluene and xylenes, alcohols such as tertiary butanol, ethers such as diethyl ether and dioxane, esters such as ethyl acetate and ethyl benzoate, alkyl and aryl halides such as carbon tetrachloride, chloroform, ethylene dichloride, ethyl chloride and chlorobenzene, ketones such as acetone and cyclohexanone, nitriles such as acetonitrile and benzonitrile, and the like. It is preferred to employ dispersing agents to aid in the proper mixing and dispersing of water insoluble monomers and catalysts in aqueous systems. Any of a number of dispersing agents commonly employed in the emulsion polymerization of vinyl compounds may be used such as those containing as the active ingredients the sodium salts of higher alkyl sulfates such as sodium decyl, dodecyl and tetradecyl sulfates; the sodium salts of higher alkane sulfonates such as sodium decyl and dodecyl sulfonates; the monosodium salt of sulfated methyl oleate; the sodium salt of sulfonated oleyl acetate; sodium oleate and the like.

A wide variety of polymerization catalysts may be employed in the practice of this invention. Among the most useful of these catalysts are those compounds capable of initiating polymerization such as free radical generating materials represented by peroxygen and azo compounds, and inorganic acids and their metal salts. By peroxygen compounds is meant a compound containing the peroxygen linkage, —O—O—; and by azo compounds is meant a compound containing the azo linkage, —N=N—. Examples of compounds of this kind useful in the practice of this invention are peroxygen compounds such as diacyl peroxides including dibenzoyl peroxide, benzoyl acetyl peroxide, dilauroyl peroxide, diacetyl peroxide and dipropionyl peroxide, dialkyl peroxides including diethyl peroxide, dipropyl peroxide and di-(tertiary butyl) peroxide, hydrogen peroxide, inorganic peroxides including barium peroxide, magnesium peroxide and zinc peroxide, and salts of non-metallic inorganic peroxygen acids including ammonium persulfate, potassium persulfate, sodium persulfate, potassium percarbonate, potassium perphosphate and sodium perborate, the salts of peroxygen acids being especially effective if used in conjunction with minor proportions of an auxiliary catalyst such as sodium bisulfite, sodium hydrosulfite, potassium ferricyanide, etc.; azo compounds such as alpha,alpha' - azobis(alpha,gamma-dimethyl-valero-nitrile), dimethyl and diethyl alpha, alpha' - azodiisobutyrate, 1,1'-azodicyclohexane-carbonitrile, alpha,alpha' - azobis(alphamethyl-butyronitrile), alpha,alpha' - azobis(alpha-ethyl-butyronitrile) and alpha,alpha'-azobisdiisobutyrocarbonamide; and inorganic acids and their metal salts such as sulfuric acid, phosphoric acid, aluminum chloride, zinc chloride, boron trichloride, boron trifluoride and the like. The catalyst should be employed in an amount in excess of 0.001% (based on the total weight of monomers), and preferably, there is employed between 0.1 and 1.0% of catalyst.

A very small amount of the vinyl isocoumaran relative to the styrene or halogen substituted styrene yields products having properties and utility quite different from the polymer obtained by polymerizing either of these components alone. Thus the copolymer of Example III containing 10% of the vinyl isocoumaran and 90% styrene compare in certain important properties with the polymers of the separate components as follows:

*Polymers of styrene and 1,1,3,3-tetramethyl-4-vinylisocoumaran*

| Ratio Styrene to VIC | Softening Point (° C.) | Izod Impact Strength | Tensile Strength | Flexural Strength |
|---|---|---|---|---|
| 100/0 | 100 | 0.182 | 3,300 | 6,400 |
| 90/10 | 105 | 0.221 | 5,590 | 10,730 |
| 0/100 | >250 | | | |

In the first column of the above table the letters VIC refer to 1,1,3,3-tetramethyl-4-vinylisocoumaran. In the third, fourth and fifth columns the strengths are given in pounds per square inch. In these columns the dashes indicate that the sample was too brittle for measuring the strength. Styrene copolymers prepared in accordance with the present invention soften at least 5° C. higher than polystyrene itself. The most useful copolymers are those containing on the basis of the weight of the copolymer from 2 parts of the vinyl isocoumaran and 98 parts of the styrene compound to 50 parts of the vinyl isocoumaran and 50 parts of the styrene compound. However, copolymers which differ appreciably from the separately polymerized components are obtained within the range of from 1 part of the vinyl isocoumaran and 99 parts of the styrene compound to 90 parts of the vinyl isocoumaran and 10 parts of the styrene compound.

The vinyl isocoumarans used in the practice of the present invention are best prepared by the self-condensation of the corresponding (vinylethinyl)carbinols according to the method described in Chemical Abstracts 37, 2343 (1943), and Chemical Abstracts 39, 1619 (1945). For example, 1,1,3,3 - tetramethyl-4-vinylisocoumaran can be readily prepared by the self condensation of dimethyl(vinylethinyl)carbinol,

which in turn can be obtained from monovinylacetylene and acetone. In this condensation two molecules of the carbinol yield one molecule of water and one molecule of vinyl isocoumaran having the structural formula previously given wherein all of the R substituents are methyl groups.

The copolymers described herein are useful in the manufacture of a large number of improved products in the molding, textile, and film-forming yields. For example, they can be molded under elevated temperatures and pressures into films, foils, tapes, and massive articles, characterized by high softening properties. These polymers can be spun into valuable fibers by melt or solution extrusion techniques, and these can be oriented by drawing and can be knitted or woven into a variety of useful fabrics. By solvent casting techniques, films valuable as wrapping foils, etc. may be prepared. These polymers in suitable form such as films can be employed as dielectrics for condenser construction, spacers for storage batteries and the like. Of particular utility are the high softening transparent molded products containing about 5–20% of the vinyl isocoumaran which can be used in a variety of articles for decorative and mechanical purposes.

As many apparently widely different embodiments of this invention may be made without departing from the spirit and scope thereof, it is to be understood that I do not limit myself to the specific embodiments thereof except as defined in the appended claims.

I claim:

1. A copolymer comprising the copolymerization product of a vinyl isocoumaran and a substance selected from the group consisting of styrene and halogenated styrenes, said copolymer containing, by weight of said vinyl isocoumaran and said substance, from 2% to 50% of said vinyl isocoumaran, said vinyl isocoumaran being of the formula

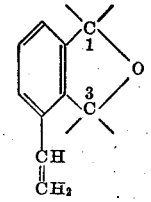

wherein the two valences of each of carbon atoms at positions 1 and 3 are satisfied by substituents selected from the group consisting of hydrogen and hydrocarbon radicals consisting of monovalent alkyl radicals, monovalent aryl radicals, and divalent polymethylene radicals having a chain of four to five carbon atoms, not more than one of said substituents being hydrogen, the valences of carbon atoms at positions 1 and 3, when satisfied by a polymethylene radical, being attached to the terminal carbon atoms of a divalent polymethylene radical having a chain of four to five carbon atoms to form a polymethylene ring of five to six carbon atoms.

2. The copolymer defined in claim 1 in which one valence of each carbon atom in positions 1 and 3 in said vinyl isocoumaran is satisfied by an alkyl radical containing from 1 to 6 carbon atoms.

3. The copolymer defined in claim 1 in which all the valences of each carbon atom in positions 1 and 3 in said vinyl isocoumaran are satisfied by CH₃.

4. The copolymer set forth in claim 1 in which all the valences of each carbon atom in positions 1 and 3 in the said vinyl isocoumaran are satisfied by methyl groups, said copolymer softening at least 5° C. higher than polystyrene.

5. A process for obtaining copolymers which comprises reacting, in the presence of a polymerization catalyst at a temperature of from 25° C. to 200° C. and under a pressure of at least atmospheric, a vinyl isocoumaran and a substance selected from the group consisting of styrene and substituted styrenes, said vinyl isocoumaran being present in amount of 2% to 50% by weight of said substance and said vinyl isocoumaran, said vinyl isocoumaran being of the formula

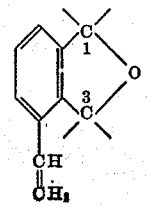

wherein the two valences of each of carbon atoms at positions 1 and 3 are satisfied by substituents selected from the group consisting of hydrogen and hydrocarbon radicals consisting of monovalent alkyl radicals, monovalent aryl radicals, and divalent polymethylene radicals having a chain of four to five carbon atoms, not more than one of said substituents being hydrogen, the valences of carbon atoms at positions 1 and 3, when satisfied by a polymethylene radical, being attached to the terminal carbon atoms of a divalent polymethylene radical having a chain of four to five carbon atoms to form a polymethylene ring of five to six carbon atoms.

6. The process set forth in claim 5 in which one valence of each carbon atom in positions 1 and 3 in said vinyl isocoumaran is satisfied by an alkyl radical containing from 1 to 6 carbon atoms.

7. The process set forth in claim 5 in which all of the valences of each carbon atom in positions 1 and 3 in said vinyl isocoumaran are satisfied by $CH_3$.

ARTHUR L. BARNEY.

No references cited.